United States Patent Office 3,452,229
Patented June 24, 1969

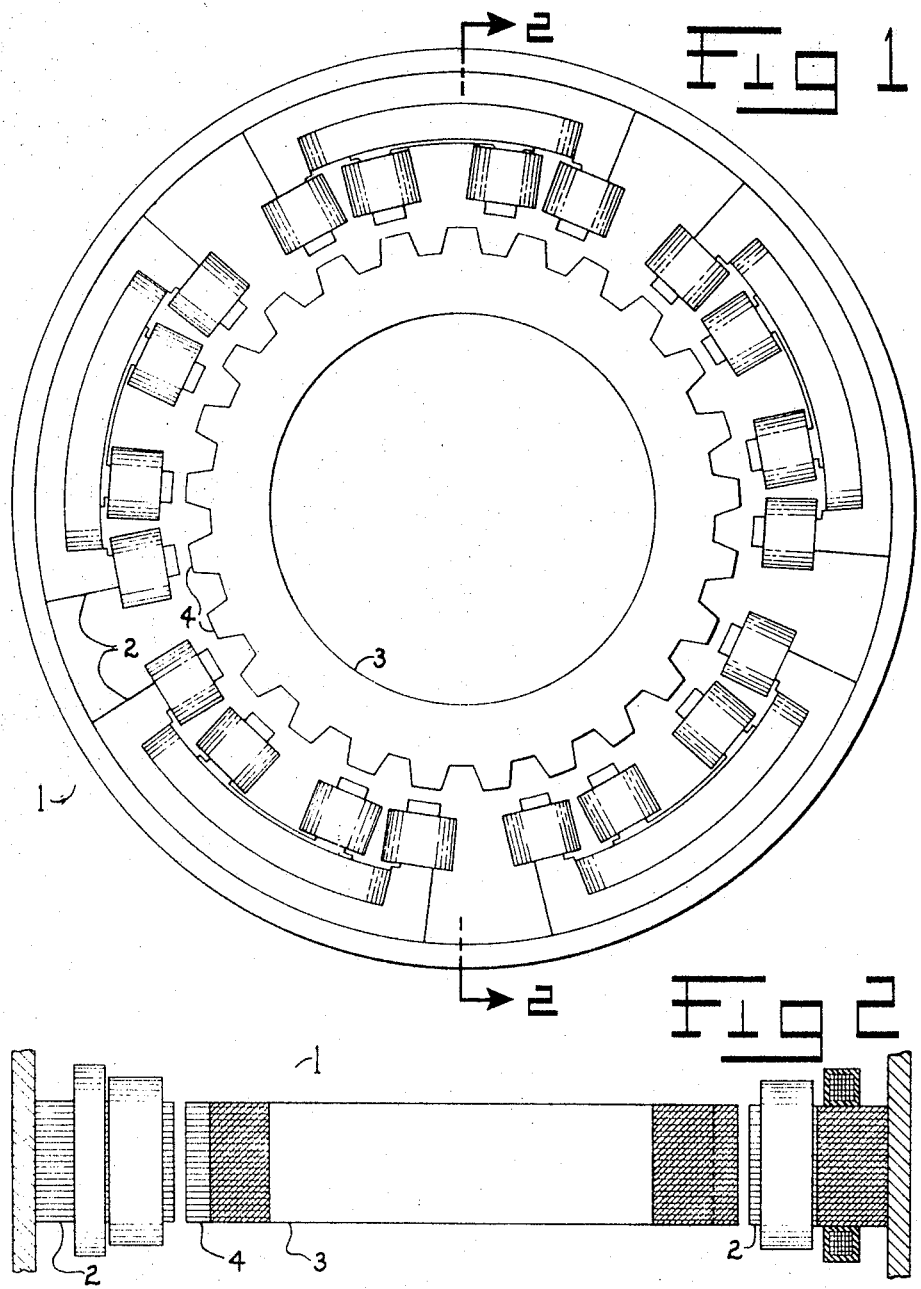

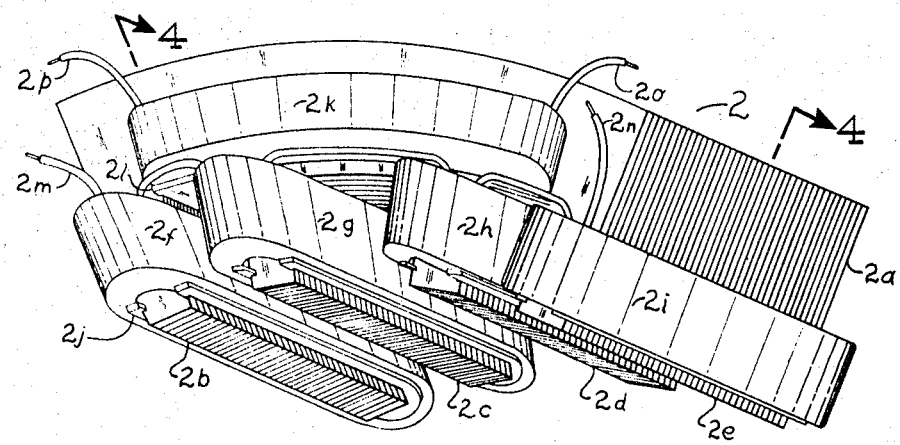
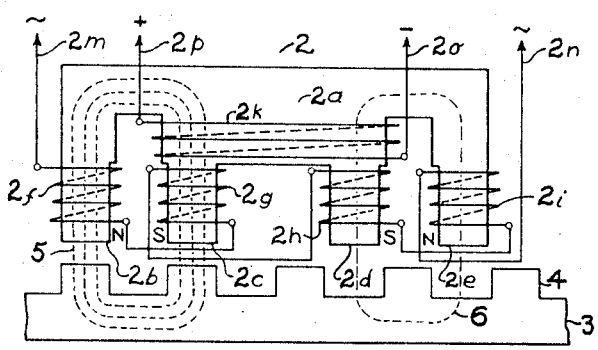
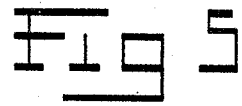

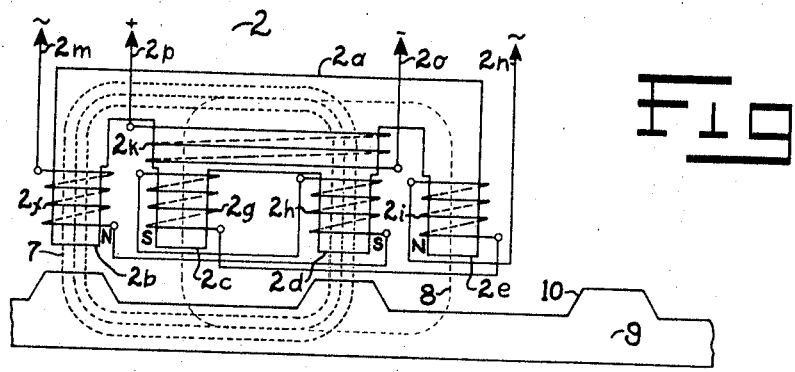
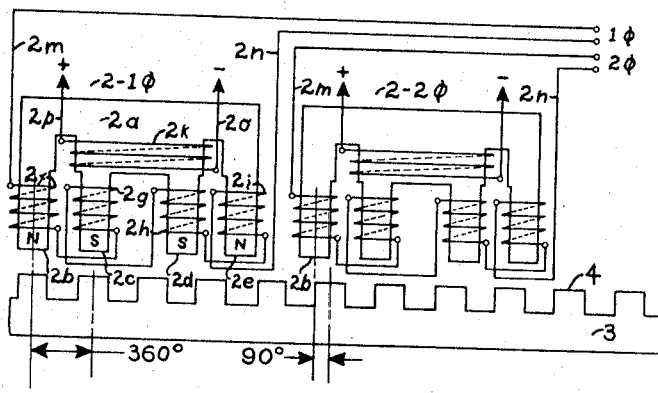
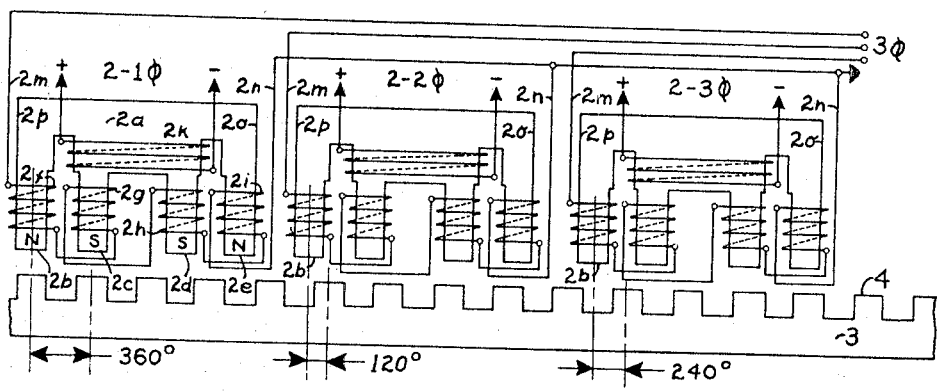

3,452,229
MODULAR INDUCTOR ALTERNATOR
John Rex Pimlott, Lubbock, Tex., and John Rex Pimlott, Jr., Lanham, Md. (both of P.O. Box 27, Hurlwood, Tex. 79328)
Filed Sept. 16, 1966, Ser. No. 580,016
Int. Cl. H02k 17/42, 19/20, 19/24
U.S. Cl. 310—168                        15 Claims

ABSTRACT OF THE DISCLOSURE

An inductor alternator is composed of a stator made of one or more stator modules mounted so that the reluctance of the magnetic circuit of each is varied by a common rotating polar armature to generate an A.C. current which can be either single phase or polyphase.

---

This invention relates to dynamoelectric machines of the type known as heteropolar inductor alternators, which are characterized by having stationary field and generator windings mounted on a magnetic structure in fixed relation to one another. The change in magnetic flux necessary to generate the desired electrical power is then provided by the rotation of projecting poles of a common armature.

The inductor alternator is one of the oldest forms of alternating current generators, being used in the early days of electrical power generation mainly because the inherent high armature reaction provided protection against short-circuits. The inductor alternator was superseded by the more efficient synchronous alternator when circuit-protective devices became available. Years later, specialized versions of the inductor alternator were devised to supply high-frequency power for radio telegraphy, being again superseded in a few years by the development of large vacuum tubes. Recently, the inductor alternator has been revived to supply high-frequency power for welding, induction heating, induction furnaces, and compact power units for automotive, aviation and space vehicles.

For modern applications of high-frequency power to the inductive welding, heat-treating, and melting of metals, and most particularly in regard to melting, it has been found that the most efficacious frequency for use with the ferrous metals ranges between 1000 to 1500 cycles per second and between 400 to 700 cycles per second for the non-ferrous metals. At power levels above 25 kva., the inductor alternator is most commonly selected to generate these frequencies, and is generally custom-built for each application, resulting in a rather high unit cost.

The cost per generated kva. for these varied, but related applications, could be greatly reduced if a method could be devised whereby a family of inductor alternators could be readily assembled from basic stock components, the number of such stock components utilized determining the electrical characteristics of the individual inductor alternators.

It is the object of our invention to provide means to satisfy the above criteria. We have devised a method which will enable a family of inductor alternators of widely-varying electrical characteristics, to be readily and economically assembled, utilizing an electrically and magnetically independent stator segment as the basic module. We have also devised a method to interchange armatures which will enable two desired frequencies to be generated by the same alternator. We have further devised a method whereby a number of such alternator units may be combined within a single frame to secure increased electrical capacity at a greatly reduced cost per generated kva.

Specifically, the special features of our invention are: a modular inductor alternator, having a stator consisting of one or more mutually independent stator modules mounted in such manner that the reluctance of the magnetic circuit of each will be varied by a rotating polar armature common to all, and generating an alternating current which may be either single phase or polyphase, and which will be the resultant output of said stator modules singly, or connected in series, in parallel or in any combination thereof; said stator modules having an improved magnetic circuit devised to achieve maximum utilization of iron and copper and being completely preassembled ready for insertion in the alternator structure; interchangeable armatures to obtain different frequencies from the same alternator; and methods for compounding modular inductor alternator units to provide increased capacity within a single frame.

The means by which the objects of the invention are obtained are described more fully with reference to the accompanying drawings in which:

FIGURE 1 is an end view of one form of the modular inductor alternator, showing only the essential parts;

FIGURE 2 is a cross-sectional view taken on the line 2—2 of FIGURE 1;

FIGURE 3 is a perspective view of an assembled stator module;

FIGURE 4 is a cross-sectional view taken on the line 4—4 of FIGURE 3;

FIGURE 5 is a schematic view of a stator module in conjunction with the associated armature poles to show the magnetic paths and electrical connections;

FIGURE 6 is a schematic view of a stator module in conjunction with the associated poles of an armature having a different pole spacing from that shown in FIGURE 5;

FIGURE 7 is a schematic view showing the stator module arrangement for generating two-phase current;

FIGURE 8 is a schematic view showing the stator module arrangement for generating three-phase current;

Figure 9:
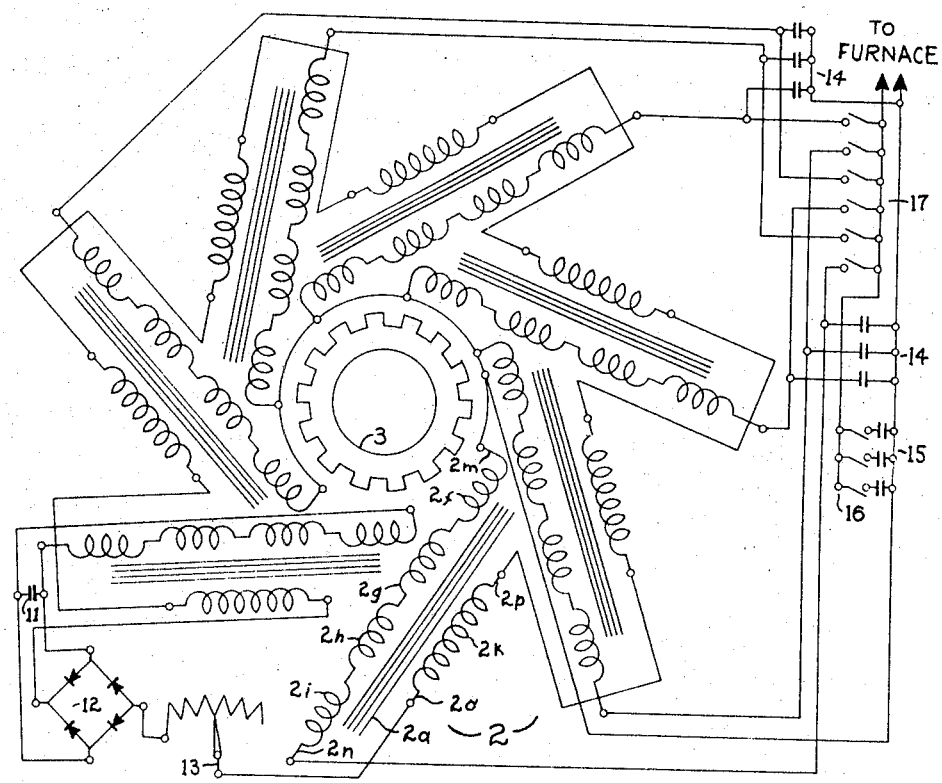
FIGURE 9 is a circuit diagram of one form of the modular inductor alternator arranged for delivering power to an induction furnace.

As shown in FIGURES 1 and 2, a modular inductor alternator 1 is made in accordance with this invention by the assembly of a predetermined number of stator modules 2, which are more fully described in FIGURES 3 and 4. The rotating polar armature 3, composed of mechanically bonded magnetic laminations, has provided on the periphery, a plurality of salient poles 4, and is so mounted that the peripheral paths of the poles 4 are common to each pole of every stator module 2.

The exact details of the alternator structure are relatively unimportant to this invention since these will vary with the installation requirement for a particular machine. In general, the stator shell and armature shafting may be made of either magnetic or non-magnetic materials. The stator shell is preferably made from non-magnetic materials but magnetic materials are permissible providing non-magnetic spacers are used to mount the stator modules at least one pole space from the stator shell.

FIGURES 3 and 4 show the preassembled stator module 2, which is comprised of: the magnetic segment of an annulus 2a, composed of a plurality of magnetic laminations mechanically bound together to form a magnetically integral structure, or it may also consist of a ferro-magnetic sintered material, and forming on the inner radius, four radially inwardly projecting poles 2b, 2c, 2d and 2e, which are circumaxially spaced apart into two pairs of poles, each pair of poles having the same circumaxial displacement and the two adjacent poles of each pair of poles being circumaxially displaced apart by a distance equivalent to one and one-half times the circumaxial displacement of each pair of poles; the preformed generator coils 2f, 2g, 2h and 2i placed over and being received by each individual pole and being retained by nonmagnetic horseshoe clips 2j, fitting into notches in the sides of the poles; the preformed excitor coil 2k, placed in slots originating centrally between each pair of poles and extending radially outwardly into the magnetic segment, the radial depth terminating sufficiently to prevent any magnetic restriction in the radially remaining portion of the magnetic segment. Non-magnetic wedges 21 driven into notches in the sides of the excitor slots are used to retain the excitor coil. Leads are brought out from each of the four generator coils and are interconnected as will be described in FIGURE 5, leaving only the two output leads 2m and 2n exposed. Two leads 2o and 2p are also brought out from the excitor coil. If so desired, the stator module 2 can be encapsulated in an insulating and waterproofing compound, such as epoxy, leaving only the pole faces, outer periphery, and coil leads exposed.

In FIGURE 5, it will be seen that the excitor coil 2k creates in the magnetic segment 2a a magnetic flux defining the magnetic paths such that each pair of poles contains poles of unlike polarity and the two adjacent poles of each pair of poles are each of like polarity. Thus, the two outer poles 2b and 2e will be both of like polarity and the two inner or adjacent poles 2c and 2d will be each of opposite polarity to the two outer poles. As shown here for the purpose of illustration, the two outer poles are both North poles N and the two adjacent poles are both South poles S. These polarities may be reversed, of course, without affecting the operation of the stator module, except that all stator modules in a given alternator are preferably excited the same. Whenever two armature poles 4 are in conjunction with one pair of stator module poles, such as poles 2b and 2c, for example, the magnetic circuit will be completed and the maximum magnetic flux 5 will be created. As shown, the pitch or pole spacing of the armature poles 4 is the same as the pole spacing of each pair of stator module poles (or 360 electrical degrees). The two adjacent stator module poles 2c and 2d, however, are circumaxially displaced by one and one-half pole spaces (540 electrical degrees), and therefore, the pair of stator module poles 2d and 2e will be displaced 180 electrical degrees from the pair of stator module poles 2b and 2c, establishing the position of minimum flux 6. As the armature rotates, the positions of maximum flux and minimum flux will alternate for every incremental change of one-half pole space, or 180 electrical degrees, in angular travel of the armature. By this means, the simultaneous increase and decrease of the magnetic flux existing in the magnetic segment is kept balanced and, at any given instant, the total magnetic flux will be at a constant level.

As the armature poles rotate past the stator module poles, the magnetic flux through each stator module pole will continuously vary from minimum to maximum, and in each of the associated generator coils 2f, 2g, 2h and 2i, there will be generated a sinusoidal EMF, having the neutral axis displaced from the zero axis, being considered here to be in a positive direction for the generator coils associated with North poles and in a negative direction for generator coils associated with South poles. Since each pair of stator module poles consists of a North pole and a South pole, the EMF's generated in the two associated generator coils will be in phase but opposite in direction, and in order to be additive, one EMF must be reversed in direction. Therefore, if the generator coils associated with a pair of stator module poles are connected in series opposition, the two EMF's will add vectorially and the resultant EMF will contain both the fundamental and even harmonics and will be displaced about the zero axis. To illustrate, generator coils 2f and 2g are connected in series opposition and likewise for generator coils 2h and 2i. As previously explained, the two pairs of stator module poles are displaced magnetically by 180 electrical degrees and therefore, the resultant EMF's from the two pairs of associated generator coils are likewise displaced by 180 electrical degrees. The resultant EMF of the pair of generator coils 2f and 2g may be added vectorially to the resultant EMF of the pair of generator coils 2h and 2i very simply by connecting generator coil 2g to generator coil 2h in series aiding as shown in FIGURE 5. The fundamentals of the two resultant EMF's are in phase but displaced by 180 electrical degrees and will add vectorially but the even harmonics are both displaced and out-of-phase by 180 electrical degrees and therefore will cancel. The resulting alternating current output of the stator module 2 is a fairly pure sine wave of the fundamental frequency.

It is thus evident that the stator module 2 is an electrically and magnetically independent unit and is completely assembled and wired ready for operation when inserted in the alternator structure. Each stator module is mutually independent, being operable as a separately excited unit, or as a self-excited unit by means of suitable rectification. The minimum number of stator modules that may be utilized in a given single-phase alternator is one; the maximum number is limited only by physical requirements. There is no fixed relation between the number of stator modules and the number of armature poles in a given alternator, the number of armature poles being determined by the frequency desired at the rotational speed of the selected prime mover. The spacing of the armature poles, however, is a selected factor of the spacing of each pair of stator module poles.

As an economical method of obtaining the two desirable ranges of frequencies previously mentioned, it will be demonstrated that two armatures, each having a different number of poles, can be interchanged within the same modular inductor alternator structure. As shown in FIGURE 6, the same basic stator module 2 is now used in conjunction with an armature 9, having projecting poles 10 which are circumaxially spaced apart by a distance equivalent to two and one-half times the circumaxial displacement of a pair of stator module poles. This armature pole spacing is equivalent to the sum of the circumaxial displacement of a pair of stator module poles plus the circumaxial displacement between the adjacent poles of each pair of stator module poles. The stator module 2 remains exactly the same physically but electrically the generator coils are connected differently. The magnetic flux path created by the excitor coil 2k still causes stator module poles 2b and 2e to be both of like polarity and the two adjacent poles 2c and 2d to be both of opposite polarity to poles 2b and 2e. However, due to the new armature pole spacing, the armature poles 10 are now in conjunction with stator module poles 2b and 2d, establishing the maximum flux 7. Stator module poles 2c and 2e are now at the position of minimum flux 8 and are therefore displaced 180 electrical degrees from stator module poles 2b and 2d. Stator module poles 2b and 2d being of opposite polarity, the associated generator coils 2f and 2h are connected in series opposition to obtain a vectorially added resultant EMF. Likewise, stator module poles 2c and 2e are of opposite polarity and the associated generator coils 2g and 2i are also connected in series opposition to obtain the resultant EMF. The resultant EMF of generator coils 2f and 2h is displaced 180 electrical degrees from the resultant EMF of generator coils 2g and 2i, and these two EMF's may be added vectorially as explained in FIGURE 5 to obtain an alternating current output containing only the fundamental frequency. The only change that has been made in the stator module 2 is that the finish lead from generator coil 2f is reconnected to the finish lead of generator coil 2i. Now if the number of poles on armatures 3 and 9 are in the same ratio as the ratio of their respective pole spacing, or 2.5 to 1, the two armatures will interchange in the same modular inductor alternator, providing the two generator leads are reconnected. Thus, two frequencies in the desired range can be obtained although the output will be reduced at the lower frequency. It is to be noted that the electrical pole spacing of each armature is 360 electrical degrees even though the mechanical pole spacing is quite different.

The theoretical operation of the modular inductor alternator has been presented thus far entirely in relation to the generation of single-phase current. For this purpose, the stator modules are mounted such that the radial centerline of one corresponding pole of each stator module coincides with the radial centerline of a conjunctive armature pole at the same angular displacement of the armature. It is not required that the stator modules be equally circumaxially displaced.

In consonance with the philosophy of utilizing the basic stator module 2 to provide readily assembled alternators of varying electrical characteristics, the single-phase modular inductor alternator, as described in FIGURE 5, may be converted to the generation of polyphase currents by a simple rearrangement of selected stator modules. As shown in FIGURE 7, the stator modules 2 are arranged in pairs to obtain the generation of two-phase currents. The first stator module of each pair is mounted such that the radial centerline of one pole, such as pole 2b, for example, coincides with the radial centerline of a conjunctive armature pole 4. Then, at the same angular displacement of armature 3, the second stator module of each pair is mounted such that the radial centerline of the corresponding pole 2b is displaced by one-fourth pole spacing, or 90 electrical degrees, from the radial centerline of a conjunctive armature pole 4. The alternating current generated by the first of each pair of stator modules will lead or lag by 90 electrical degrees, depending upon the direction of the armature, the alternating current generated by the second stator module. The electrical output of each pair of stator modules will therefore be two-phase alternating current. As shown in FIGURE 7, the output is 4-wire two phase, although 3-wire two-phase may also be obtained. For example, the modular inductor alternator shown in FIGURE 1 has five stator modules, one of which is used for excitation. The remaining four stator modules may be arranged in two pairs for two-phase generation and the two pairs connected in either series, in parallel, or used as a single pair.

A similar procedure may be employed to convert the single-phase modular inductor alternator, described in FIGURE 5, to the generation of three-phase current as shown in FIGURE 8, wherein the stator modules 2 are arranged in groups of three. The first, or Phase 1 stator module, is mounted with the radial centerline of one pole, shown here as pole 2b, coincident with the radial centerline of a conjunctive armature pole 4. At the same angular displacement of armature 3, the second, or Phase 2 stator module, is mounted with the radial centerline of corresponding pole 2b displaced by one-third pole spacing, or 120 electrical degrees, from the radial centerline of a conjunctive armature pole 4, while the third, or Phase 3 stator module, is mounted with the radial centerline of its corresponding pole 2b displaced by two-thirds pole spacing, or 240 electrical degrees, from the radial centerline of a conjunctive pole 4. The Phase 2 stator module is therefore displaced 120 electrical degrees from the Phase 1 stator module while the Phase 3 stator module is displaced 120 electrical degrees from the Phase 2 stator module and 240 electrical degrees from the Phase 1 stator module. The electrical output of each group of three stator modules will therefore be a three-phase alternating current. Although a 4-wire Y-connection is shown in FIGURE 8, a 3-wire delta-connection also may be used. As an example, the modular inductor alternator shown in FIGURE 9 has seven stator modules, one of which provides excitation. The remaining six stator modules may be arranged into two groups of three stator modules each to provide a three-phase output, the two groups being connected in either series, in parallel, or used as a single group.

The procedures described in FIGURES 7 and 8 for conversion of the single-phase modular inductor alternator described in FIGURE 5 to polyphase current generation are equally applicable for conversion of the single-phase modular inductor alternator described in FIGURE 6, and no further explanation is considered necessary.

FIGURE 9 depicts the schematic circuit diagram for a single-phase modular inductor alternator delivering power to an induction furnace of 500-pound capacity. This alternator is designed to deliver 100 kva. of electrical power at 440 volts and at a frequency of 1050 c.p.s. at 1800 r.p.m. The armature 3 contains 35 poles and is 18 inches in diameter. The stator shell is 32 inches in diameter and contains seven stator modules 2. The axial depth of the armature and stator module magnetic structures is 12 inches. One stator module 2 is used as a self-excited exciter unit, the output being rectified by a full-wave rectifier 12 and controlled by rheostat 13. The output load on the exciter unit is constant and capacitor 11 provides excellent power-factor correction. All stator module exciter coils are connected in series. The stator modules 2 are connected individually to the induction furnace by switches 17 in accordance with load requirements. Each stator module is individually compensated for a minimum power-factor requirement by a capacitor 14. Overall power-factor correction, in accordance with load requirements, is accomplished through the medium of capacitors 15, controlled by switches 16.

Both examples of modular inductor alternators previously discussed have been self-excited alternators constructed with an odd number of stator modules. It is not intended for these examples to be restrictive. The modular inductor alternator may be constructed with either an odd or even number of stator modules and may be either separately excited or self-excited. For self-excitation, the excitation power, after rectification, may be taken from the total output of the alternator, or each stator module may be excited from its own output, or one self-excited stator module may serve as an exciter unit. The latter choice is generally the simplest and most satisfactory in operation.

The basic stator module may be utilized to the best economic advantage in the compound modular inductor alternator which is constructed by the assembly of a series of axially spaced modular inductor alternator units in a common frame. Each alternator unit may be any one of the types previously described in FIGURES 5 through 8, and the alternator units may be all of one type, or more than one type may be used in any combination. The total number of alternator units that may be assembled to form one compound modulator inductor alternator is limited only by mechanical considerations.

Figure 10:
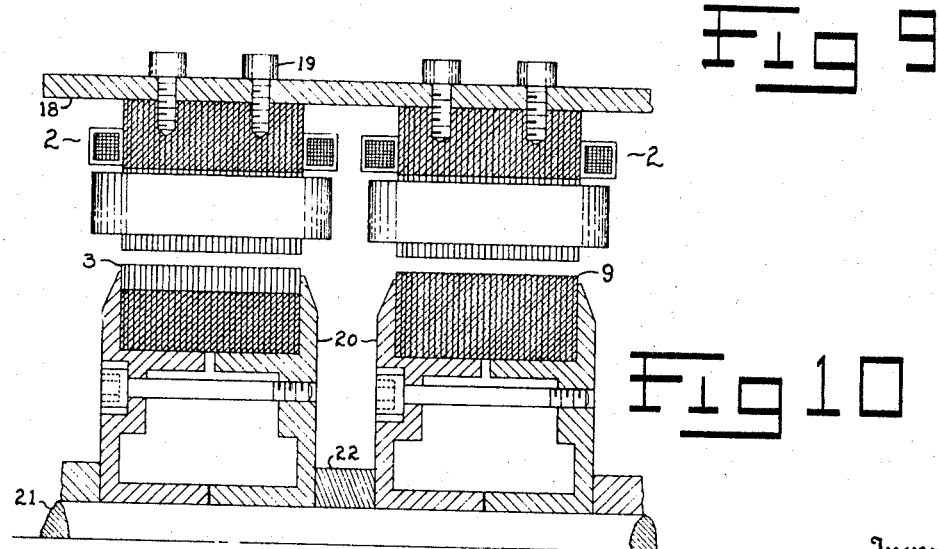
FIGURE 10 is a cross-sectional view of one form of a compound modular inductor alternator.

FIGURE 10 shows one embodiment of a compound modular inductor alternator comprised of two axially spaced alternator units, each unit being similar in size to the alternator described in FIGURE 9. The stator modules 2 are mounted in a common, non-magnetic stator shell 18 by the time-proven method of non-magnetic capscrews 19 engaging tapped holes in the magnetic structure of the stator module (also shown in FIGURE 4). The dual armatures 3 and 9 carried in armature spiders 20 are mounted on a common armature shaft 21 and axially spaced apart by spacer 22. The spiders and shafting may be made of either magnetic or non-magnetic materials since they are not part of the magnetic circuit. The alternator unit utilizing armature 3 functions in accordance with the theory described in FIGURE 5, and armature 9 functions in accordance with the theory described in FIGURE 6. The stator modules for both alternator units are identical in construction, differing only in the electrical connections.

When the compound modular of FIGURE 10 is driven at a speed of 1800 r.p.m., the alternator unit, utilizing armature 3 having 35 poles, will generate a frequency of 1050 c.p.s. The alternator unit, utilizing armature 9 having 14 poles, will generate a frequency of 420 c.p.s. This particular alternator was designed for use in an experimental foundry having a requirement for melting ferrous and non-ferrous metals on an intermixed schedule. The frequency of 1050 c.p.s. is satisfactory for melting ferrous metals, while the frequency of 420 c.p.s. is more suitable for melting non-ferrous metals. By using an induction furnace having removable crucibles, metals of either type may be melted when desired. The compound modular inductor alternator with only one prime mover and control system, is more flexible in use and more economical to construct than two conventional inductor alternator systems.

Having now described the means by which the objects of the invention are obtained, we claim:

1. A stator construction for an inductor alternator of the type having a stationary stator and unwound rotating armature comprising: a stator module, constituting an electrically and magnetically independent segment of a stator, one or more of which is utilized to construct stators differing in electrical characteristics, said stator module being the combination of: a segment of an annulus of magnetic material with four poles extending radially inwardly and circumaxially spaced apart into two pairs of poles, each pair of poles having the same circumaxial displacement and with the two adjacent poles of each pair of poles being circumaxially displaced by one and one-half times the circumaxial displacement of each pair of poles; an exciting coil mounted in two slots in said segment, each slot being positioned intermediate of each pair of said two pairs of poles and extending radially outwardly in said segment but terminating sufficiently to prevent magnetic restriction in the radially remaining portion, said exiting coil creating with the armature a magnetic flux in said segment and magnetically defining the flux path such that in the said two pairs of poles, each pair of poles contains poles of opposite polarity and the two adjacent poles of each pair of poles are each of the same polarity; four generator coils, one each of which is received by and surrounds one pole each of the said two pairs of poles; means connecting said generator coils in series such that in each pair of said two pairs of poles, the generator coil associated with a pole of one polarity is connected in series opposition with the generator coil associated with a pole of opposite polarity, and the generator coils associated with the two adjacent poles of each pair of poles are connected in series aiding.

2. A stator construction for an inductor alternator of the type having a stationary stator and unwound rotating armature comprising: a stator module, constituting an electrically and magnetically independent segment of a stator, one or more of which is utilized to construct stators differing in electrical characteristics, said stator module being the combination of: a segment of an annulus of magnetic material with four poles extending radially inwardly and circumaxially spaced apart into two pairs of poles, each pair of poles having the same circumaxial displacement and with the two adjacent poles of each pair of poles being circumaxially displaced by one and one-half times the circumaxial displacement of each pair of poles; an exciting coil mounted in two slots in said segment, each slot being positioned intermediate of each pair of said two pairs of poles and extending radially outwardly in said segment but terminating sufficiently to prevent magnetic restriction in the radially remaining portion, said exciting coil creating with the armature a magnetic flux in said segment and magnetically defining the flux path such that in the said two pairs of poles, each pair of poles contains poles of opposite polarity and the two adjacent poles of each pair of poles are each of the same polarity; four generator coils, one each of which is received by and surrounds one pole each of the said two pairs of poles; means connecting said generator coils in series such that in one pair of said two pairs of poles, each generator coil associated with a pole of one polarity is connected in series opposition with the generator coil associated with a pole of opposite polarity in the other pair of poles, and the generator coils associated with the two adjacent poles of each pair of poles are connected in series aiding.

3. An inductor alternator, operable either as self-excited or separately excited, and comprising: a segmented stator assembled from one or more mutually independent stator modules; said stator modules being the combination of: a segment of an annulus of magnetic material with four poles extending radially inwardly and circumaxially spaced apart into two pairs of poles, each pair of poles having the same circumaxial displacement and with the two adjacent poles of each pair of poles being circumaxially displaced by one and one-half times the circumaxial displacement of each pair of poles; an exciting coil mounted in two slots in said segment, each slot being positioned intermediate of each pair of said two pairs of poles and extending radially outwardly in said segment but terminating sufficiently to prevent magnetic restriction in the radially remaining portion, said exciting coil creating with the armature a magnetic flux in said segment and magnetically defining the flux path such that in the said two pairs of poles, each pair of poles contains poles of opposite polarity and the two adjacent poles of each pair of poles are each of the same polarity; four generator coils, one each of which is received by and surrounds one pole each of the said two pairs of poles; means connecting said generator coils in series such that in each pair of said two pairs of poles, the generator coil associated with a pole of one polarity is connected in series opposition with the generator coil associated with a pole of opposite polarity, and the generator coils associated with the two adjacent poles of each pair of poles are connected in series aiding; an unwound armature having an annulus of magnetic material provided with a plurality of salient poles circumaxially spaced apart by a distance equal to the circumaxial displacement of each pair of said stator module poles; means mounting said armature in coaxial alignment for magnetic compatibility with said stator modules and adapted for rotation such that the peripheral paths of all said armature poles are common to all of said stator module poles; means mounting said stator modules such that the radial centerline of one corresponding pole of each said stator module is in angular alignment with the radial centerline of a conjunctive pole of said armature at the same angular displacement of said armature; and means connecting each said stator module such that a single-phase current is generated which is the resultant output of said stator modules, either singly, in parallel, in series, or in any combination thereof.

4. An inductor alternator, operable either as self-excited or separately excited, and comprising: a segmented stator assembled from one or more mutually independent stator modules; said stator modules being the combination of: a segment of an annulus of magnetic material with four poles extending radially inwardly and circumaxially spaced apart into two pairs of poles, each pair of poles having the same circumaxial displacement and with the two adjacent poles of each pair of poles being circumaxially displaced by one and one-half times the circumaxial displacement of each pair of poles; an exciting coil mounted in two slots in said segment, each slot being positioned intermediate of each pair of said two pairs of poles and extending radially outwardly in said segment but terminating sufficiently to prevent magnetic restriction in the radially remaining portion, said exciting coil creating with the armature a magnetic flux in said segment and magnetically defining the flux path such that in the said two pairs of poles, each pair of poles contains poles of opposite polarity and the two adjacent poles of each pair of poles are each of the same polarity; four generator coils, one each of which is received by and surrounds one pole each of the said two pairs of poles; means connecting said generator coils in series such that in one pair of said two pairs of poles, each generator coil associated with a pole of one polarity is connected in series opposition with the generator coil associated with a pole of opposite polarity in the other pair of poles and the generator coils associated with the two adjacent poles of each pair of poles are connected in series aiding; an unwound armature having an annulus of magnetic material provided with a plurality of salient poles circumaxially spaced apart by a distance equivalent to two and one-half times the circumaxial displacement of each pair of said stator module poles; means mounting said armature in coaxial alignment for magnetic compatibility with said stator modules and adapted for rotation such that the peripheral paths of all said armature poles are common to all of said stator module poles; means mounting said stator modules such that the radial centerline of one corresponding pole of each said stator module is in angular alignment with the radial centerline of a conjunctive pole of said armature at the same angular displacement of said armature; and means connecting each said stator module such that a single-phase current is generated which is the resultant output of said stator modules, either singly, in parallel, in series, or in any combination thereof.

5. In an inductor alternator as in claim 3, said stator modules being arranged in groups of two; means mounting the first stator module of each said group of two stator modules such that the radial centerline of one corresponding pole of each is in angular alignment with the radial centerline of a conjunctive pole of said armature at the same angular displacement of said armature; means mounting the second stator module of each said group of two stator modules such that, at the same angular displacement of said armature, the radial centerline of one corresponding pole of each is displaced from the radial centerline of a conjunctive pole of said armature by a circumaxial distance equivalent to one-fourth the circumaxial displacement between the poles of said armature; means connecting each said group of two stator modules such that a two-phase current is generated which is the resultant output of said groups of two stator modules either in parallel, in series, as a single group, or in any combination thereof.

6. In an inductor alternator as in claim 4, said stator modules being arranged in groups of two; means mounting the first stator module of each said group of two stator modules such that the radial centerline of one corresponding pole of each is in angular alignment with the radial centerline of a conjunctive pole of said armature at the same angular displacement of said armature; means mounting the second stator module of each said group of two stator modules such that, at the same angular displacement of said armature, the radial centerline of one corresponding pole of each is displaced from the radial centerline of a conjunctive pole of said armature by a circumaxial distance equivalent to one-fourth the circumaxial displacement between the poles of said armature; means connecting each said group of two stator modules such that a two-phase current is generated which is the resultant output of said groups of two stator modules either in parallel, in series, as a single group, or in any combination thereof.

7. In an inductor alternator as in claim 3, said stator modules being arranged in groups of three; means mounting the first stator module of each said group of three stator modules such that the radial centerline of one corresponding pole of each is in angular alignment with the radial centerline of a conjunctive pole of said armature at the same angular displacement of said armature; means mounting the second stator module of each said group of three stator modules such that, at the same angular displacement of said armature, the radial centerline of one corresponding pole of each is displaced from the radial centerline of a conjunctive pole of said armature by a circumaxial distance equivalent to one-third the circumaxial displacement between the pole of said armature; means mounting the third stator module of each said group of three stator modules such that, at the same angular displacement of said armature, the radial centerline of one corresponding pole of each is displaced from the radial centerline of a conjunctive pole of said armature by a circumaxial distance equivalent to two-thirds the circumaxial displacement between the poles of said armature; and means connecting each said group of three stator modules such that a three-phase current is generated which is the resultant output of said groups of three stator modules either in parallel, in series, as a single group, or in any combination thereof.

8. In an inductor alternator as in claim 4, said stator modules being arranged in groups of three; means mounting the first stator module of each said group of three stator modules such that the radial centerline of one corresponding pole of each is in angular alignment with the radial centerline of a conjunctive pole of said armature at the same angular displacement of said armature; means mounting the second stator module of each said group of three stator modules such that, at the same angular displacement of said armature, the radial centerline of one corresponding pole of each is displaced from the radial centerline of a conjunctive pole of said armature by a circumaxial distance equivalent to one-third the circumaxial displacement between the poles of said armature; means mounting the third stator module of each said group of three stator modules such that, at the same angular displacement of said armature, the radial centerline of one corresponding pole of each is displaced from the radial centerline of a conjunctive pole of said armature by a circumaxial distance equivalent to two-thirds the circumaxial displacement between the poles of said armature; and means connecting each said group of three stator modules such that a three-phase current is generated which the resultant output of said groups of three stator modules either in parallel, in series, as a single group, or in any combination thereof.

9. In an inductor alternator as in claim 3, further comprising a plurality of said axially arranged segmented stators mounted in a common housing, each said segmented stator being composed of one or more said stator modules; a plurality of said armatures axially arranged on a common shaft and adapted for rotation such that each said armature is in coaxial relation to and magnetically conjunctive with the said associated segmented stator; said armatures being mounted on said common shaft such that the radial centerline of one pole in each said armature is in angular alignment at the same angular displacement of said common shaft; and said stator modules being mounted such that in each said segmented stator, the radial centerline of one corresponding pole of each stator module is in angular alignment with the radial centerline of a conjunctive pole of the associated armature at the same angular displacement of said common shaft.

10. In an inductor alternator as in claim 4, further comprising a plurality of said axially arranged segmented stators mounted in a common housing, each said segmented stator being composed of one or more said stator modules; a plurality of said armatures axially arranged on a common shaft and adapted for rotation such that each said armature is in coaxial relation to and magnetically conjunctive with said associated segmented stator; said armatures being mounted on said common shaft such that the radial centerline of one pole in each said armature is in angular alignment at the same angular displacement of said common shaft; and said stator modules being mounted such that in each said segmented stator, the radial centerline of one corresponding pole of each stator module is in angular alignment with the radial centerline of a conjunctive pole of the associated armature at the same angular displacement of said common shaft.

11. In an inductor alternator as in claim 5, further comprising a plurality of said axially arranged segmented stators mounted in a common housing, each said segmented stator being composed of one or more said groups of two stator modules; a plurality of said armatures axially arranged on a common shaft and adapted for rotation such that each said armature is in coaxial relation to and magnetically conjunctive with the said associated segmented stator; said armatures being mounted on said common shaft such that the radial centerline of one pole in each said armature is in angular alignment at the same angular displacement of said common shaft; and said stator modules being mounted such that in each said segmented stator, the radial centerline of one corresponding pole of each said first stator module of each said group of two stator modules is in angular alignment with the radial centerline of a conjunctive pole of the said associated armature at the same angular displacement of said common shaft.

12. In an inductor alternator as in claim 6, further comprising a plurality of said axially arranged segmented stators mounted in a common housing, each said segmented stator being composed of one or more said groups of two stator modules; a plurality of said armatures axially arranged on a common shaft and adapted for rotation such that each said armature is in coaxial relation to and magnetically conjunctive with the said associated segmented stator; said armatures being mounted on said common shaft such that the radial centerline of one pole in each said armature is in angular alignment at the same angular displacement of said common shaft; and said stator modules being mounted such that in each said segmented stator, the radial centerline of one corresponding pole of each said first stator module of each said group of two stator modules is in angular alignment with the radial centerline of a conjunctive pole of the said associated armature at the same angular displacement of said common shaft.

13. In an inductor alternator as in claim 7, further comprising a plurality of said axially arranged segmented stators mounted in a common housing, each said segmented stator being composed of one or more said groups of three stator modules; a plurality of said armatures axially arranged on a common shaft and adapted for rotation such that each said armature is in coaxial relation to and magnetically conjunctive with the said associated segmented stator; said armatures being mounted on said common shaft such that the radial centerline of one pole in each said armature is in angular alignment at the same angular displacement of said common shaft; and said stator modules being mounted such that in each said segmented stator, the radial centerline of one corresponding pole of each said first stator module of each said group of the three stator modules is in angular alignment with the radial centerline of a conjunctive pole of the said associated armature at the same angular displacement of said common shaft.

14. In an inductor alternator as in claim 8, further comprising a plurality of said axially arranged segmented stators mounted in a common housing, each said segmented stator being composed of one or more said groups of three stator modules; a plurality of said armatures axially arranged on a common shaft and adapted for rotation such that each said armature is in coaxial relation to and magnetically conjunctive with said associated segmented stator; said armatures being mounted on said common shaft such that the radial centerline of one pole in each said armature is in angular alignment at the same angular displacement of said common shaft; and said stator modules being mounted such that in each said segmented stator, the radial centerline of one corresponding pole of each said first stator module of each said group of three stator modules is in angular alignment with the radial centerline of a conjunctive pole of the said associated armature at the same angular displacement of said common shaft.

15. An inductor alternator comprising in combination a plurality of axially spaced generator units mounted in a common housing, each unit comprising in combination a segmented stator comprised of one or more stator modules; said stator modules being the combination of: a segment of an annulus of magnetic material provided with four inwardly projecting poles circumaxially spaced apart into two pairs of poles; a single magnetizing winding producing two pairs of unlike magnetic poles with the adjacent poles of each pair of poles being of the same polarity; a plurality of generator windings being individual to each of said poles; a plurality of axially spaced armatures made of laminated magnetic material and mounted on a common shaft; said armatures being provided with a plurality of salient poles and adapted for rotation such that each said armature is in coaxial relation to and magnetically conjunctive with the said associated segmented stator; the circumaxial displacement of the said poles of said armatures being either equal to, or two and one-half times, or any combination thereof, of the circumaxial displacement of said pairs of poles of said stator modules; and means connecting said stator modules to provide a single-phase output from each of said generator units.

References Cited

UNITED STATES PATENTS

| | | | |
|---|---|---|---|
| 3,157,810 | 11/1964 | Adkins | 310—168 |
| 3,206,623 | 9/1965 | Snowdon | 310—263 |
| 3,132,272 | 5/1964 | Macfarlane | 310—263 |
| 3,321,652 | 5/1967 | Opel | 310—263 |

MILTON O. HIRSHFIELD, *Primary Examiner.*

G. P. TOLIN, *Assistant Examiner.*

U.S. Cl. X.R.

310—185